United States Patent
Strandborg et al.

(10) Patent No.: US 12,495,136 B2
(45) Date of Patent: *Dec. 9, 2025

(54) DYNAMIC LIGHT STEERING BASED ON RELATIVE LOCATION OF VIEWER

(71) Applicant: Distance Technologies Oy, Helsinki (FI)

(72) Inventors: Mikko Strandborg, Hangonkylä (FI); Urho Konttori, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 33 days.

This patent is subject to a terminal disclaimer.

(21) Appl. No.: 18/630,168

(22) Filed: Apr. 9, 2024

(65) Prior Publication Data

US 2025/0317550 A1    Oct. 9, 2025

(51) Int. Cl.
*H04N 13/383* (2018.01)
*G02B 30/28* (2020.01)
*H04N 13/32* (2018.01)
*H04N 13/368* (2018.01)
*H04N 13/398* (2018.01)

(52) U.S. Cl.
CPC ........... *H04N 13/383* (2018.05); *G02B 30/28* (2020.01); *H04N 13/32* (2018.05); *H04N 13/368* (2018.05); *H04N 13/398* (2018.05)

(58) Field of Classification Search
CPC ...... H04N 13/383; H04N 13/32; H04N 1/368; H04N 13/398; G02B 30/28
USPC ............................................. 348/51; 359/465
See application file for complete search history.

(56) References Cited

U.S. PATENT DOCUMENTS

| | | | | |
|---|---|---|---|---|
| 10,854,171 | B2 * | 12/2020 | Clarke | G07F 17/3211 |
| 11,960,083 | B2 * | 4/2024 | Sluka | G02B 27/0075 |
| 12,196,960 | B1 * | 1/2025 | Konttori | G02B 27/0101 |
| 2004/0263968 | A1 | 12/2004 | Kobayashi et al. | |
| 2011/0032346 | A1 * | 2/2011 | Kleinberger | H04N 13/315 348/59 |

(Continued)

FOREIGN PATENT DOCUMENTS

WO    2022182887 A1    9/2022

OTHER PUBLICATIONS

European Patent Office, Extended European Search Report, Application No. 25165827.4-1207, Dated Jul. 11, 2025, 10 Pages.

*Primary Examiner* — Behrooz M Senfi
(74) *Attorney, Agent, or Firm* — ZIEGLER IP LAW GROUP, LLC.

(57) ABSTRACT

A light field image is displayed via a light field display unit to produce a synthetic light field. A light-steering optical device is controlled, based on a relative location of a first eye and a second eye of user(s) with respect to an imaginary image plane, to direct light emanating from a first set of photo-emitting cells towards the first eye and light emanating from a second set of photo-emitting cells of the light-emitting surface towards the second eye. When controlling the light-steering optical device, a first viewing direction and a second viewing direction are determined for a given first photo-emitting cell and a given second photo-emitting cell, respectively. Light emanating from the given first photo-emitting cell and from the given second photo-emitting cell is directed along the first viewing direction and the second viewing direction, respectively.

18 Claims, 5 Drawing Sheets

(56) References Cited

U.S. PATENT DOCUMENTS

| | | | |
|---|---|---|---|
| 2014/0139652 A1* | 5/2014 | Aiden | H04N 13/305 |
| | | | 348/54 |
| 2017/0085867 A1* | 3/2017 | Baran | B41M 3/008 |
| 2017/0177075 A1* | 6/2017 | Zhang | G02B 27/0172 |
| 2018/0088377 A1 | 3/2018 | Lu et al. | |
| 2018/0262758 A1* | 9/2018 | El-Ghoroury | G02B 27/017 |
| 2019/0293939 A1* | 9/2019 | Sluka | G02B 27/0172 |
| 2023/0282183 A1* | 9/2023 | Chapiro | G09G 5/10 |
| | | | 345/691 |

* cited by examiner

DYNAMIC LIGHT STEERING BASED ON RELATIVE LOCATION OF VIEWER

TECHNICAL FIELD

The present disclosure relates to systems incorporating dynamic light steering based on relative locations of viewers. The present disclosure also relates to methods incorporating dynamic light steering based on relative locations of viewers.

BACKGROUND

Existing autostereoscopy techniques often employ lenticular arrays for generating stereoscopic images to be presented to eyes of a user. Typically, a given lenticule of a lenticular array is arranged to receive light emanating from two or more photo-emitting cells of a display. As viewing angles vary between a left eye and a right eye of a user, displaying different images to different eyes of the user allows for achieving a stereoscopic effect.

However, the existing autostereoscopy techniques have a significant drawback. Notably, such techniques are capable of providing a stereoscopic effect only when the eyes of the user are located within a very narrow range of viewing angles with respect to an optical axis of the given lenticule. Any deviation from these viewing angles often results in a loss of the stereoscopic effect or a degradation of an overall visual quality of images presented to the eyes of the user. In an example, when the given lenticule of the lenticular array corresponds to two photo-emitting cells of the display, the stereoscopic effect is only perceptible when a left eye and a right eye of the user are located on opposite sides of the optical axis of the given lenticule.

Some existing autostereoscopy techniques often employ a lenticular array having large-sized lenticules, wherein a given large-sized lenticule corresponds to four or more photo-emitting cells of the display. However, such an implementation does not mitigate the aforesaid constraint of the very narrow range of the viewing angles, as it only marginally increases a number of viable viewing angles/positions (namely, sweet spots). Moreover, as only a fraction of photo-emitting cells of the display is actually visible to the user at any given time, this not only reduces an effective resolution of the images but also compromises an overall brightness of the display, thereby adversely affecting a viewing experience of the user.

Figure 1A:
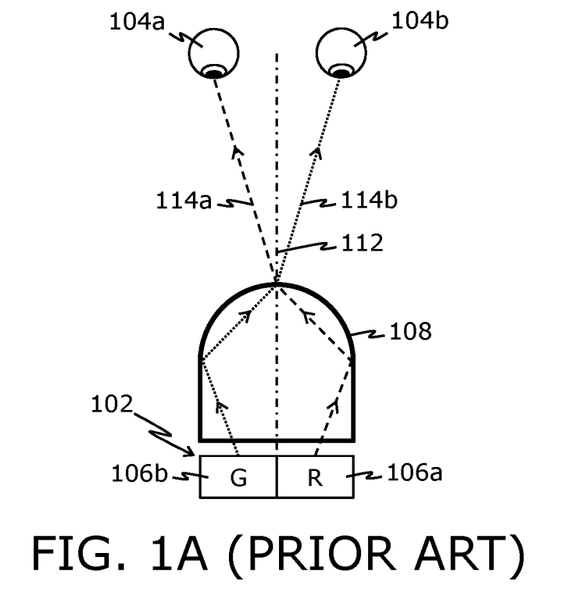
FIGS. 1A (Prior Art) and 1B (Prior Art) illustrate different exemplary scenarios of how light emanating from a light-emitting surface is directed towards a first eye and a second eye of a user by using existing techniques.
Figure 1B:
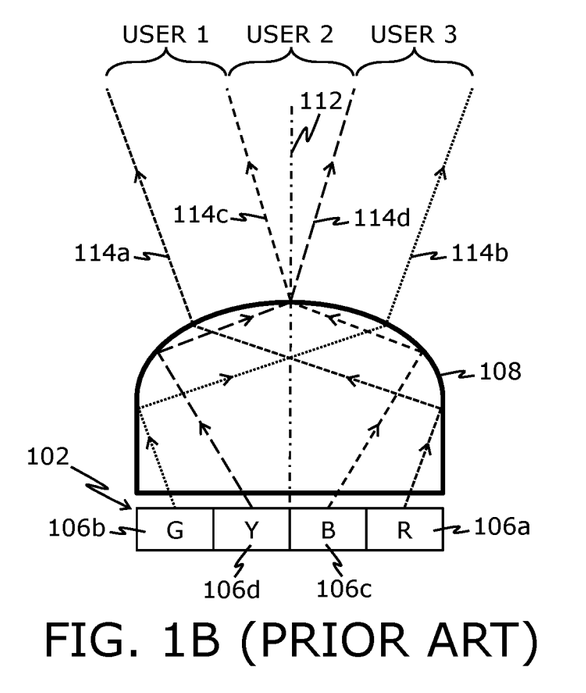

Referring to FIGS. 1A (Prior Art) and 1B (Prior Art), illustrated are different exemplary scenarios of how light emanating from a light-emitting surface 102 is directed towards a first eye 104a and a second eye 104b of a user by using existing techniques; FIGS. 1A and 1B represent prior art. For sake of simplicity and clarity, only a portion of the light-emitting surface 102 is shown. With reference to FIG. 1A (Prior Art), the shown portion comprises two photo-emitting cells 106a and 106b, wherein the photo-emitting cell 106a is a red colour photo-emitting cell (depicted using a letter "R") and the photo-emitting cell 106b is a green colour photo-emitting cell (depicted using a letter "G"). A given lenticule 108 of a lenticular array is arranged on an optical path of the two photo-emitting cells 106a-b. The given lenticule 108 has an optical axis 112 (depicted using a dash-dot line). Light 114a and 114b emanating from the photo-emitting cells 106a and 106b is directed by the given lenticule 108 towards the first eye 104a and the second eye 104b to display corresponding images, respectively. When viewing the corresponding images, the first eye 104a and the second eye 104b are able to perceive a stereoscopic effect only when they are located within a very narrow range of viewing angles with respect to the optical axis 112 of the given lenticule 108. For example, in this case, only when the first eye 104a and the second eye 104b are located on different sides of said optical axis 112, the aforesaid eyes perceive the stereoscopic effect.

With reference to FIG. 1B (Prior Art), the shown portion of the light-emitting surface 102 further comprises two photo-emitting cells 106c and 106d in addition to the two photo-emitting cells 106a-b, wherein the photo-emitting cell 106c is a blue colour photo-emitting cell (depicted using a letter "B") and the photo-emitting cell 106d is a yellow colour photo-emitting cell (depicted using a letter "Y"). The given lenticule 108 is arranged on an optical path of the two photo-emitting cells 106c-d, in addition to the optical path of the two photo-emitting cells 106a-b. As shown, even when a greater number of photo-emitting cells correspond to the given lenticule 108, as compared the previous scenario depicted in FIG. 1A, there are still only 3 possible sectors (namely, a red-blue sector, a blue-yellow sector, and a yellow-green sector) where the stereoscopic effect can be perceived. The red-blue sector is formed for a first user (namely, user 1), when light 114a and 114c emanating from the photo-emitting cells 106a and 106c is directed by the given lenticule 108 towards eyes of the first user, respectively. The blue-yellow sector is formed for a second user (namely, user 2), when light 114c and 114d emanating from the photo-emitting cells 106c and 106d is directed by the given lenticule 108 towards eyes of the second user, respectively. The yellow-green sector is formed for a third user (namely, user 3), when light 114d and 114b emanating from the photo-emitting cells 106d and 106b is directed by the given lenticule 108 towards eyes of the third user, respectively.

Therefore, in light of the foregoing discussion, there exists a need to overcome the aforementioned drawbacks.

SUMMARY

The present disclosure seeks to provide a system and a method to present high-quality, accurate virtual images via a synthetic light field to eyes of one or more users, in a computationally-efficient and time-efficient manner. The aim of the present disclosure is achieved by an imaging system and a method which incorporate dynamic light steering based on relative locations of viewers, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  tracking means;
  a light field display unit comprising:
    a light-emitting surface comprising a plurality of photo-emitting cells;
    a lenticular array arranged on an optical path of the light-emitting surface, the lenticular array comprising a plurality of lenticules; and
    a light-steering optical device arranged on the optical path of the light-emitting surface; and
  at least one processor configured to:
    utilise the tracking means to determine a relative location of a first eye and of a second eye of at least one user with respect to an imaginary image plane on which virtual images are to be presented to the first eye and the second eye; and
    display a light field image via the light field display unit to produce a synthetic light field presenting the virtual images, whilst controlling the light-steering optical device, based on the relative location of the first eye and of the second eye of the at least one user, to direct light emanating from a first set of photo-emitting cells of the light-emitting surface towards the first eye and light emanating from a second set of photo-emitting cells of the light-emitting surface towards the second eye,
  wherein when controlling the light-steering optical device, the at least one processor is configured to:
    determine a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user, respectively, the given first photo-emitting cell neighbouring the given second photo-emitting cell on the light-emitting surface; and
    control a given portion of the light-steering optical device that lies on an optical path of the given first photo-emitting cell and the given second photo-emitting cell, based on the first viewing direction and the second viewing direction, to direct light emanating from the given first photo-emitting cell along the first viewing direction and light emanating from the given second photo-emitting cell along the second viewing direction.

In a second aspect, an embodiment of the present disclosure provides a method comprising:
  utilising tracking means to determine a relative location of a first eye and of a second eye of at least one user with respect to an imaginary image plane on which virtual images are to be presented to the first eye and the second eye; and
  displaying a light field image via a light field display unit to produce a synthetic light field presenting the virtual images, whilst controlling a light-steering optical device, based on the relative location of the first eye and of the second eye of the at least one user, to direct light emanating from a first set of photo-emitting cells of a light-emitting surface towards the first eye and light emanating from a second set of photo-emitting cells of the light-emitting surface towards the second eye, wherein the light field display unit comprises: the light-emitting surface comprising a plurality of photo-emitting cells; a lenticular array arranged on an optical path of the light-emitting surface, the lenticular array comprising a plurality of lenticules; and the light-steering optical device arranged on the optical path of the light-emitting surface,
wherein the step of controlling the light-steering optical device comprises:
  determining a first viewing direction and a second viewing direction for a given first photo-emitting cell belonging to the first set of photo-emitting cells and a given second photo-emitting cell belonging to the second set of photo-emitting cells, based on the relative location of the first eye and of the second eye of the at least one user, respectively, the given first photo-emitting cell neighbouring the given second photo-emitting cell on the light-emitting surface; and
  controlling a given portion of the light-steering optical device that lies on an optical path of the given first photo-emitting cell and the given second photo-emitting cell, based on the first viewing direction and the second viewing direction, to direct light emanating from the given first photo-emitting cell along the first viewing direction and light emanating from the given second photo-emitting cell along the second viewing direction.

The present disclosure provides the aforementioned system and the aforementioned method incorporating dynamic light steering based on relative locations of eyes of the at least one user (namely, viewers), to present high-quality, accurate virtual images via the synthetic light field in a computationally-efficient and time-efficient manner. By dynamically controlling the light-steering optical device, the light is directed in a manner (according to the first viewing direction and the second viewing direction) that the eyes of the at least one user would perceive a stereoscopic effect highly realistically and accurately when viewing the virtual images, irrespective of where the eyes of the at least one user are located with respect to an optical axis of a given lenticule (for example, even when the first eye and the second eye are located on a same side of the optical axis of the given lenticule); unlike in the prior art, where a stereoscopic effect is perceived only when eyes of a user are located within a very narrow range of viewing angles with respect to an optical axis of a given lenticule, and any deviation from these viewing angles resulted in a loss of the stereoscopic effect or a degradation of an overall visual quality of images displayed to said eyes. Beneficially, this enables the at least one user to perceive depth in virtual content being presented through the virtual images, thereby enhancing an overall viewing experience of the at least one user. Moreover, the system and the method are robust, fast, reliable, support real-time simultaneous presentation of virtual images (via the synthetic light field) to eyes of one or more users by way of employing dynamic light steering based on relative locations of the eyes.

Throughout the present disclosure, the term "tracking means" refers to specialised equipment for detecting and/or following a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracking means. When different types of images captured by the various different types of tracking cameras are utilised, a location of user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the user's eyes. A relative location of the at least one tracking camera with respect to the imaginary image plane is pre-known, because information pertaining to a distance of a plane from the user's eyes whereat the virtual images are to be presented, i.e., a location of the imaginary image plane is already known to the at least one processor. This enables to determine the relative location of the first eye and of the second eye of the at least one user with respect to the imaginary image plane. Optionally, in this regard, when the tracking means are utilised to detect and/or follow the location of the first eye and of the second eye, a location of the first eye and of the second eye with respect to the at least one tracking camera is accurately known. Thus, the relative location of the first eye and of the second eye with respect to the imaginary image plane can be determined, based on the relative location of the at least one tracking camera with respect to the imaginary image plane and the location of the first eye and of the second eye with respect to the at least one tracking camera. Such a determination may utilise a coordinate geometry-based technique and/or a trigonometry-based technique.

Optionally, the relative location of the first eye and of the second eye is represented in a given coordinate space. As an example, the given coordinate space may be a Cartesian coordinate space. The Cartesian coordinate space is well-known in the art. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the tracking means is employed to repeatedly track the location of at least eyes of the given user throughout a given session of using the system. This allows for repeatedly determining the relative location of the first eye and of the second eye with respect to the imaginary image plane in real time or near-real time. Beneficially, this subsequently allows for presenting the at least one user with an augmented view of the synthetic light field with the real-world light field in an autostereoscopic manner. It is to be understood that when the synthetic light field is being produced for a plurality of users simultaneously, relative locations of both eyes of each user from amongst the plurality of users are determined in a same manner as discussed hereinabove. Moreover, the relative location of the first eye and of the second eye is determined with respect to the imaginary image plane, because the virtual images would be presented (using the synthetic light field produced by the light field display unit) to the first eye and the second on the imaginary image plane.

The at least one processor controls an overall operation of the system. The at least one processor is communicably coupled to at least the tracking means and the light field display unit (specifically, to a driving circuit of the light-emitting surface and a driving circuit of the light-steering optical device). Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "light field display unit" refers to specialised equipment that is capable of producing the synthetic light field. In other words, the light field display unit is utilised to display the light field image (which may be generated by the at least one processor) to produce the synthetic light field presenting the virtual images at a given resolution.

Throughout the present disclosure, the term "light-emitting surface" refers to a surface in the light field display unit wherefrom light is emanated. It is to be understood that said light is emanated from the plurality of photo-emitting cells of the light-emitting surface. The plurality of photo-emitting cells could be arranged, for example, in a rectangular two-dimensional (2D) grid, a polygonal arrangement, a circular arrangement, an elliptical arrangement, or similar, on the light-emitting surface. Typically, the light-emitting surface comprises millions of photo-emitting cells. The light-emitting surface could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display.

Throughout the present disclosure, the term "lenticular array" refers to an array of optical elements that is capable of directing light passing therethrough in different directions simultaneously. This allows the lenticular array to present a multiscopic view to the at least one user without any need for her/him to wear three-dimensional (3D) glasses for viewing purposes. It will be appreciated that the lenticular array is arranged on the optical path of the light-emitting surface (namely, on top of the light-emitting surface) in a manner that a given lenticule from amongst the plurality of lenticules corresponds to at least two photo-emitting cells of the light-emitting surface. In other words, the given lenticule is arranged on an optical path of the at least two photo-emitting cells. The given lenticule could, for example, be a micromirror, a microlens, a microprism, or the like. The lenticular array could be a regular lenticular array in which a size and/or a shape of all lenticules is same, or be an irregular lenticular array in which the size and/or the shape of the lenticules is varying. The lenticular array is well-known in the art.

Throughout the present disclosure, the term "light-steering optical device" refers to specialised equipment that is capable of directing (namely, steering) light emanating from photo-emitting cells of the light-emitting surface towards eyes of a given user. In some implementations, the light-steering optical device is arranged on top of the lenticular array. In other implementations, the light-steering optical device is arranged in-between the light-emitting surface and the lenticular array. The light-steering optical device could be implemented in various different ways, for example, such as a solid-state optics layer (for example, such as a liquid-crystal beam-shaping layer or similar), an image-shifting layer (that could, for example, be constructed from two consecutive light-bending layers), or similar.

Optionally, the at least one processor is configured to generate the light field image, based on the relative location of the first eye and of the second eye of the at least one user with respect to the imaginary image plane. Such a manner of generating the light field image is unlike the prior art where a light field image is generated for several different locations, irrespective of whether or not any user is present at those locations. Thus, for a given native resolution of the light field display unit, an effective resolution of the virtual images presented to the first eye and the second eye of the at least one user is considerably higher, as compared to the prior art where an effective resolution of a virtual image presented per eye is drastically reduced.

Optionally, a given virtual image represents at least one virtual object. Optionally, in this regard, the at least one processor is configured to generate the light field image from a perspective of the relative location of the first eye and of the second eye of the at least one user, by employing a three-dimensional (3D) model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the 3D model is generated in the given coordinate space. Optionally, the at least one processor is configured to store the 3D model at a data repository that is communicably coupled to the at least one processor. The data repository may be implemented as a memory of the at least one processor, a cloud-based database, or similar.

The light field image may be understood to be a two-dimensional (2D) image comprising a plurality of pixels, wherein a first set of pixels from amongst the plurality of pixels represents visual information corresponding to the first eye, said visual information being displayed by the first set of photo-emitting cells, and a second set of pixels from amongst the plurality of pixels represents visual information corresponding to the second eye, said visual information being displayed by the second set of photo-emitting cells. It will be appreciated that, in the light field image, the pixels belonging to the first set are not arranged in a continuous manner across the light field image; similarly, the pixels belonging to the second set are also not arranged in a continuous manner across the light field image. Optionally, in the light field image, the pixels belonging to the first set and the pixels belonging to the second set are arranged in alternating vertical stripes across a horizontal field of view of the light field image, wherein each vertical stripe comprises one or more scanlines of pixels. This is because humans perceive depth mainly based on a horizontal binocular parallax. Thus, in this way, the light field image would be considerably different as compared to a conventional 2D image that is displayed via conventional 2D displays, because the (single) light field image would comprise the visual information corresponding to the first eye as well as the second eye of the at least one user. Optionally, the at least one processor is configured to determine a colour of a given pixel of the first set and a colour of a given pixel of the second set, by employing the 3D model of the at least one virtual object. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

In an example implementation, the light-steering optical device is controlled to direct light emanating from the photo-emitting cells that belong to the first set and that are arranged on a given vertical stripe within the light-emitting surface towards the first eye, and direct light emanating from the photo-emitting cells that belong to the second set and that are arranged on a given neighbouring vertical stripe within the light-emitting surface towards the second eye. In such an example implementation, a rendering capability of the light field display unit for each eye of the at least one user may be achieved by sacrificing a half of a horizontal resolution (for example, in terms of pixels per degree (PPD)) provided by the light-emitting surface of the light field display unit.

Throughout the present disclosure, the term "synthetic light field" refers to a light field that is produced (namely, generated) synthetically by the light field display unit. In case of the synthetic light field, light emanating from the light-emitting surface is incident, upon being directed by the light-steering optical device, towards the first eye and the second eye of the at least one user (as discussed hereinbelow). In this way, visual information pertaining to the at least one virtual object (namely, the virtual images) can be perceived by the first eye and the second eye.

Notably, whilst displaying the light field image to produce the synthetic light field, the light-steering optical device is controlled by the at least one processor to direct the light emanating from the first set of photo-emitting cells towards the first eye and the light emanating from the second set of photo-emitting cells towards the second eye. Optionally, when controlling the light-steering optical device, the at least one processor is configured to generate a control signal to be employed to control the light-steering optical device, to direct the light emanating from the first set of photo-sensitive cells according to the relative location of the first eye and to direct the light emanating from the second set of photo-sensitive cells according to the relative location of the second eye. As a result, the first part of the synthetic light field is incident towards the first eye such that the visual information corresponding to the first part of the light field image is perceived by the first eye as a first virtual image. Simultaneously, the second part of the synthetic light field is incident towards the second eye such that the visual information corresponding to the second part of the light field image is perceived by the second eye as a second virtual image. It will be appreciated that since the relative location of the first eye and of the second eye with respect to the imaginary image plane is readily and accurately known, the aforesaid control signal could be generated accordingly.

Optionally, the first viewing direction and the second viewing direction for the given first photo-emitting cell belonging to the first set of photo-emitting cells and the given second photo-emitting cell belonging to the second set of photo-emitting cells are determined further based on a location of the given first photo-emitting cell and a location of the given second photo-emitting cell within the light-emitting surface, respectively. The technical benefit of utilising the aforesaid locations is that the first viewing direction and the second viewing direction are determined highly accurately and realistically. Due to this, it is ensured that the light emanating from the given first photo-emitting cell and the light emanating from the given second photo-emitting cell can be conveniently and precisely directed along the first viewing direction and the second viewing direction, respectively (as discussed hereinbelow). In this way, a viewing experience of the at least one user (when viewing the virtual images) is considerably improved.

Since information pertaining to a field of view of the light-emitting surface is pre-known and accurately known, the at least one processor could ascertain a relative location of each photo-emitting cell of the light-emitting surface with respect to a centre of the light-emitting surface (through which an optical axis of the light-emitting surface passes). In addition to this, the relative location of the first eye and of the second eye, and a location of the imaginary image plane relative to the light-emitting surface are also accurately known to the at least one processor. This enables the at least one processor to easily and accurately determine the first viewing direction and the second viewing direction, for example, by mapping a given first vector that originates from a relative location of the given first photo-emitting cell to the relative location of the first eye, for determining the first viewing direction; and by mapping a given second vector that originates from a relative location of the given second photo-emitting cell to the relative location of the second eye of the at least one user, for determining the second viewing direction. It is to be understood that different first photo-emitting cells of the first set would have different first viewing directions, depending on their relative locations on the light-emitting surface with respect to the centre of the light-emitting surface; similarly, different second photo-emitting cells of the second set would have different second viewing directions, depending on their relative locations on the light-emitting surface with respect to the centre of the light-emitting surface.

Once the first viewing direction and the second viewing direction are determined, the light emanating from the given first photo-emitting cell is directed (namely, steered) along the first viewing direction, and the light emanating from the given second photo-emitting cell is directed along the second viewing direction, by controlling the given portion of the light-steering optical device accordingly. In this regard, when the light emanating from the photo-emitting cells belonging to the first set is directed, based on respective first viewing directions, towards the first eye, it means that the first part of the synthetic light field is directed towards the first eye for displaying the first virtual image to the first eye. Simultaneously, when the light emanating from the photo-emitting cells belonging to the second set is directed, based on respective second viewing directions, towards the second eye, it means that the second part of the synthetic light field is directed towards the second eye for displaying the second virtual image to the second eye. The technical benefit of dynamically controlling the light-steering optical device in the aforesaid manner is that irrespective of where the eyes of the at least one user are located with respect to an optical axis of a given lenticule (for example, even when the first eye and the second eye are located on a same side of the optical axis of the given lenticule), the light is directed in a manner (according to the first viewing direction and the second viewing direction) that the eyes of the at least one user would still perceive a stereoscopic effect highly realistically and accurately when viewing the virtual images; unlike in the prior art where a stereoscopic effect is perceived only when eyes of a user are located within a very narrow range of viewing angles with respect to an optical axis of a given lenticule, and any deviation from these viewing angles results in a loss of the stereoscopic effect or a degradation of an overall visual quality of images displayed to said eyes. This has been also illustrated in conjunction with FIGS. 4A and 4B, for sake of better understanding and clarity.

Moreover, optionally, the system further comprises an optical combiner arranged on an optical path of the light field display unit and on an optical path of a real-world light field of a real-world environment, wherein the optical combiner is employed to reflect the light emanating from the first set of photo-emitting cells and the light emanating from the second set of photo-emitting cells towards the first eye and the second eye, respectively, whilst optically combining the real-world light field with a first part of the synthetic light field produced by the light emanating from the first set of photo-emitting cells and with a second part of the synthetic light field produced by the light emanating from the second set of photo-emitting cells.

The term "optical combiner" refers to specialised equipment that is capable of reflecting a corresponding part of the synthetic light field towards a given eye of a given user, whilst optically combining said corresponding part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the at least one user comprises a plurality of users, some users from amongst the plurality of users may directly face the optical combiner (namely, in almost a straight manner), while remaining users may face the optical combiner in a diagonal manner (namely, obliquely or sideways). Optionally, a tilt angle of the optical combiner with respect to an image plane of the light field display unit lies in a range of 30 degrees and 60 degrees.

It will be appreciated that when the optical combiner reflects the light emanating from the first set of photo-emitting cells towards the first eye, it means that the first part of the synthetic light field is directed towards the first eye upon reflecting off the optical combiner. Simultaneously, when the optical combiner reflects the light emanating from the second set of photo-emitting cells towards the second eye, it means that the second part of the synthetic light field is directed towards the second eye upon reflecting off the optical combiner. Therefore, upon said reflection of the first part and the second part of the synthetic light field, the virtual images are presented to the first eye and the second eye, respectively. Additionally, when the first part and the second part of the synthetic light field are optically combined with the real-world light field, virtual content represented in the first virtual image and the second virtual image is perceived by the left eye and the right eye, respectively, along with perceiving visual information pertaining to real-world objects present in the real-world environment. Advantageously, this provides a result that is similar to displaying a combined view of a virtual image augmenting a real-world image to the at least one user.

The term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tube-light, or similar), are reflected off the real-world objects (or their portions) to be incident towards the first eye and the second eye of the at least one user. In this way, visual information (for example, such as colour information, optical depth information, and the like) pertaining to said real-world objects is typically perceived by the left eye and the right eye.

Furthermore, in an embodiment, the lenticular array and the light-steering optical device are implemented together as a liquid-crystal optical element. In this regard, the lenticular array and the light-steering optical device are not implemented as two separate individual components in the light field display unit, but are rather implemented as one single component, i.e., the liquid-crystal (LC) optical element. It will be appreciated that in operation, the LC optical element performs functions of both the lenticular array and the light-steering optical device. Optionally, in this regard, the at least one processor is configured to control the LC optical element, based on the relative location of the first eye and of the second eye, to direct the light emanating from the first set of photo-emitting cells towards the first eye and direct the light emanating from the second set of photo-emitting cells towards the second eye.

In an alternative embodiment, the light-steering optical device is implemented as a liquid-crystal optical element. In this regard, the lenticular array and the light-steering optical device are implemented as two different individual components in the light field display unit, unlike in the aforementioned embodiment.

The LC optical element enables in directing the light passing therethrough by adjusting a refractive index of an LC material in the LC optical element. In this regard, the refractive index of the LC material can be controlled electrically. Optionally, the LC optical element is implemented as at least one LC layer. In some implementations, the LC optical element could be implemented as two LC layers. In an example, the LC optical element may be implemented as a switchable LC shutter array. Electrically controlling the LC material to redirect light incident thereupon is well-known in the art.

The technical benefit of implementing the LC optical element is that the LC material in the LC optical element could be easily and conveniently controlled (electrically) to direct the light accordingly, irrespective of any viewing positions of eyes of the at least one user (namely, directing the light for a wider range of the viewing positions of the eyes of the at least one user, unlike in the prior art). This potentially enables in displaying highly accurate and realistic virtual images to the given eye of the at least one user.

Moreover, optionally, the at least one user comprises a plurality of users, wherein the at least one processor is configured to display different light field images for different users via the light field display unit, whilst controlling the light-steering optical device, based on relative locations of first eyes and second eyes of the different users, by employing temporal multiplexing. In this regard, in a multi-user scenario, the different light field images are displayed for the different users in a time-based interleaving manner. This means that a given light field image from amongst the different light field images is displayed for a given user from amongst the different users in a given time slot. It is to be understood that when the given light field image is displayed for the given user, corresponding virtual images are presented to eyes of the given user; notably, the given user does not see the given light field image itself.

In an example case where there are two users, the light-steering optical device can be controlled to direct light emanating from the light-emitting surface towards eyes of a first user and towards eyes of a second user in an alternating manner. In such a case, when a sequence of light field images are be displayed at the light field display unit at a frame rate of 120 frames per second (FPS), an effective frame rate of displaying the light field images for each of the two users would be 60 FPS due to temporal multiplexing. In the sequence of light field images, every odd-numbered light field image (comprising a first light field image, a third light field image, a fifth light field image, and so on of said sequence) is displayed for one of the two users at odd-numbered time slots (namely, a first time slot, a third time slot, a fifth time slot and so on), whereas every even-numbered light field image (comprising a second light field image, a fourth light field image, a sixth light field image, and so on of said sequence) is displayed for another of the two users at even-numbered time periods (namely, a second time slot, a fourth time slot, a sixth time slot, and so on). In other words, the light field images are displayed for each of the two users in alternating time slots. It will be appreciated that employing the temporal multiplexing in the aforesaid manner is feasible because light emanating from neighbouring photo-emitting cells can be directed towards a given user in a narrow angle due to accurate image steering functionality of the light-steering optical device. It will also be appreciated that when the temporal multiplexing is employed, even when a frame rate per user would be slightly lesser as compared to a native frame rate of the light field display unit, a given light field image would be displayed for a given user at a maximum resolution (namely, a resolution per eye or per user would be significantly higher), as compared to a scenario when the light field images are displayed for the different users simultaneously. As a result, an overall viewing experience of each user would still be considerably realistic and immersive.

Furthermore, in an embodiment, the at least one user comprises a plurality of users, wherein a given lenticule of the lenticular array is arranged on an optical path of four or more photo-emitting cells of the light-emitting surface, and wherein the at least one processor is configured to:

detect when eyes of at least one of the plurality of users are closed or the at least one of the plurality of users is not looking towards the virtual images; and     when it is detected that the eyes of the at least one of the plurality of users are closed or the at least one of the plurality of users is not looking towards the virtual images,         identify a given photo-emitting cell from amongst the four or more photo-emitting cells that corresponds to a given eye of the at least one of the plurality of users; and         dim the given photo-emitting cell that corresponds to the given eye of the at least one of the plurality of users.

Optionally, the at least one processor is configured to utilise the tracking data collected by the tracking means, for detecting when the eyes of the at least one of the plurality of users are closed. Optionally, in this regard, when the tracking data comprises a plurality of images of a given eye of a given user from amongst the plurality of users, the at least one processor is configured to: extract a plurality of features of the given eye from a given image; identify at least one of: a pupil of the given eye, a curvature of an eyelid of the given eye, a position of an eyelash of the given eye, a shape of the given eye, a size of the given eye, based on the plurality of features, to detect when the given eye of the given user is closed. It will be appreciated that by extracting the plurality of features, the at least one processor could easily identify at least a part of the given eye. In an example, the given eye of the given user is detected to be closed when the pupil of the given eye is not identified/visible in the given image. Examples of the plurality of features include, but are not limited to, edges, corners, blobs, ridges, high-frequency features, low-frequency features. Optionally, the at least one processor is configured to employ at least one data processing algorithm for extracting the plurality of features from the given image. Examples of the at least one data processing algorithm include, but are not limited to, an edge-detection algorithm, a corner-detection algorithm, a feature descriptor algorithm, a feature detector algorithm. Techniques for detecting closed eyes of users using eye tracking is well-known in the art.

It will be appreciated that at some times, the at least one of the plurality of users may not be looking towards the virtual images. Optionally, in this regard, the at least one processor is configured to utilise the tracking means to determine a gaze direction of the given eye of the given user. Therefore, by repeatedly determining the gaze direction of the given eye, the at least one processor could easily ascertain when a gaze of the at least one of the plurality of users aligns with (namely, conforms to) a location of the imaginary image plane (whereon the virtual images are to be presented), as then it may be highly likely that the at least one of the plurality of users is looking towards the virtual images. When the gaze of the at least one of the plurality of users is directed elsewhere (than the imaginary image plane or the virtual images), it is detected that the at least one of the plurality of users is not looking towards the virtual images.

Further, when it is detected that the eyes are closed or the at least one of the plurality of users is not looking towards the optical combiner, it means that the at least one of the plurality of users is not viewing the virtual images presented by the synthetic light field, and thus displaying a given set of pixels of the light field image corresponding to the at least one of the plurality of users is not required. In this regard, the given photo-emitting cell (of the light-emitting surface) that corresponds to the given eye of the at least one of the plurality of users can be dimmed, such that either the given photo-emitting cell would display black (i.e., no light) or near-black. Dimming of photo-emitting cells is well-known in the art. Advantageously, dimming the given photo-emitting cell for the at least one of the plurality of users enables in minimising a potential light leakage from the given photo-emitting cell and, therefore, in improving an overall contrast in virtual images that are to be displayed to other remaining user(s) from amongst the plurality of users. The potential light leakage is minimised, as by keeping an inactive photo-emitting cell dim, it acts as a barrier to prevent leaking/straying of the light into neighbouring parts of the synthetic light field. This may also potentially facilitate in saving processing resources and processing time of the at least one processor.

It will be appreciated that in case of the plurality of users, it is known which photo-emitting cells of the light-emitting surface correspond to a first eye of each of the plurality of users and which photo-emitting cells of the light-emitting surface correspond to a second eye of each of the plurality of users (i.e., within the light-emitting surface, locations of photo-emitting cells corresponding to eyes of each of the plurality of users are known). Thus, the given photo-emitting cell from amongst the four or more photo-emitting cells that corresponds to the given eye of the at least one of the plurality of users can be easily identified.

In an alternative embodiment, the at least one user comprises a plurality of users, wherein a given lenticule of the lenticular array is arranged on an optical path of four or more photo-emitting cells of the light-emitting surface, wherein the at least one processor is configured to:

detect when eyes of at least one of the plurality of users are closed or the at least one of the plurality of users is not looking towards the virtual images; and     when it is detected that the eyes of the at least one of the plurality of users are closed or the at least one of the plurality of users is not looking towards the virtual images,         identify a given photo-emitting cell from amongst the four or more photo-emitting cells that corresponds to a given eye of the at least one of the plurality of users;

utilise the given photo-emitting cell to produce additional light to supplement light emanating from another photo-emitting cell from amongst the four or more photo-emitting cells that corresponds to at least one other of the plurality of users; and control a corresponding portion of the light-steering optical device that lies on an optical path of the given photo-emitting cell, based on a viewing direction for the another photo-emitting cell, to direct light emanating from the given photo-emitting cell in said viewing direction.

In this regard, when eyes of the at least one other of the plurality of users are open and the at least one other of the plurality of users is actually looking towards the virtual images, the at least one processor could beneficially utilise the given photo-emitting cell to produce the additional light to supplement the light emanating from the another photo-emitting cell from amongst the four or more photo-emitting cells that corresponds to the at least one other of the plurality of users. In such a case, the corresponding portion of the light-steering optical device is controlled accordingly, to direct the light emanating from the given photo-emitting cell to supplement the light emanating from the another photo-emitting cell. The technical benefit of the aforesaid supplementation is that the light emanating from the given photo-emitting cell could be harnessed purposefully (in the aforesaid manner) to significantly improve an overall visual quality (for example, in terms of a resolution, a brightness, and the like) of virtual images in specific viewing directions/positions, for the at least one other of the plurality of users. It is to be noted that the light emanating from the given photo-emitting cell can be directed in said viewing direction because the given photo-emitting cell and the another photo-emitting cell are neighbouring photo-emitting cells within the light-emitting surface (i.e., the given photo-emitting cell is adjacent to the another photo-emitting cell that corresponds to a given eye of the at least one other of the plurality of users). Moreover, the additional light emitted from the given photo-emitting cell may, for example, be of a same or similar colour/intensity as that of the another photo-emitting cell.

Moreover, optionally, the system further comprises a temperature sensor, wherein the at least one processor is configured to:

determine an ambient temperature using the temperature sensor;

detect when the ambient temperature is below a predefined threshold temperature; and when it is detected that the ambient temperature is below the predefined threshold temperature, generate the light field image by utilising a same colour for all photo-emitting cells on whose optical path a given lenticule of the lenticular array is arranged.

In this regard, when it is detected that the ambient temperature is below the predefined threshold temperature, it may be likely that the light field display unit is employed in a cold ambient environment. In such a cold ambient environment, there may be a likelihood of the light-steering optical device of the light field display unit being inoperational, i.e., not being able to direct the light emanating from the given first photo-emitting cell and the given second photo-emitting cell along the first viewing direction and the second viewing direction, respectively. This may occur until the light-steering optical device is allowed to warm-up (i.e., generate some heat) after being switched on, to gradually reach its actual operational temperature. In an exemplary scenario where the light-steering optical device is implemented as the LC optical element, extreme cold temperatures may adversely affect a molecular structure and properties (such as a viscosity, an optical property, and the like) of the LC material in the LC optical element, potentially causing the LC material to become sluggish or even freeze. This hinders an ability of the LC material to effectively respond to applied electric fields, in order to change an orientation of LC molecules within the LC material to direct/steer the light as intended, thereby making the light-steering optical device inoperable, until it is allowed to warm-up for the LC material to regain its normal fluidity and responsiveness. It is to be noted that when the light-steering optical device is unable to operate properly, while attempting to maintain stereoscopy (when presenting the virtual images to the at least one user), this could result in misalignment or inconsistencies between said virtual images. In order to mitigate the aforesaid potential problems, the light field image is generated by utilising the same colour for all the photo-emitting cells corresponding to the given lenticule. Beneficially, by disabling the stereoscopy and ensuring that all the photo-emitting cells corresponding to the given lenticule emit light of the same colour, a uniform and coherent visual experience can be provided to the at least one user, whilst avoiding a potential discomfort or confusion to the at least one user caused due to mismatched or distorted stereoscopic imagery in the cold ambient environment. Additionally, this may also potentially facilitate in saving the processing resources and the processing time of the at least one processor.

Optionally, the temperature sensor is implemented as any one of: an infrared-based temperature sensor, a thermistor, a resistance temperature detector (RTD). The temperature sensor and their types are well-known in the art. It will be appreciated that the temperature sensor is arranged in a same ambient environment whereat the system (particularly, the light field display unit) and the at least one user are present. The temperature sensor is optionally communicably coupled to the at least one processor. The "predefined threshold temperature" refers to a temperature below which the ambient environment is considered to be a cold ambient environment. The predefined threshold temperature could, for example, be zero or near-zero degree.

The present disclosure also relates to the method as described above. Various embodiments and variants disclosed above, with respect to the aforementioned first aspect, apply mutatis mutandis to the method.

Optionally, in the method, an optical combiner is employed to reflect the light emanating from the first set of photo-emitting cells and the light emanating from the second set of photo-emitting cells towards the first eye and the second eye, respectively, whilst optically combining a real-world light field of a real-world environment with a first part of the synthetic light field produced by the light emanating from the first set of photo-emitting cells and with a second part of the synthetic light field produced by the light emanating from the second set of photo-emitting cells, wherein the optical combiner is arranged on an optical path of the light field display unit and on an optical path of the real-world light field of the real-world environment.

Optionally, the at least one user comprises a plurality of users, wherein the method further comprises displaying different light field images for different users via the light field display unit, whilst controlling the light-steering optical device, based on relative locations of first eyes and second eyes of the different users, by employing temporal multiplexing.

In an embodiment, the at least one user comprises a plurality of users, wherein a given lenticule of the lenticular array is arranged on an optical path of four or more photo-emitting cells of the light-emitting surface, and wherein the method further comprises:

detecting when eyes of at least one of the plurality of users are closed or the at least one of the plurality of users is not looking towards the virtual images; and     when it is detected that the eyes of the at least one of the plurality of users are closed or the at least one of the plurality of users is not looking towards the virtual images,         identifying a given photo-emitting cell from amongst the four or more photo-emitting cells that corresponds to a given eye of the at least one of the plurality of users; and         dimming the given photo-emitting cell that corresponds to the given eye of the at least one of the plurality of users.

In an alternative embodiment, the at least one user comprises a plurality of users, wherein a given lenticule of the lenticular array is arranged on an optical path of four or more photo-emitting cells of the light-emitting surface, wherein the method further comprises:

detecting when eyes of at least one of the plurality of users are closed or the at least one of the plurality of users is not looking towards the virtual images; and     when it is detected that the eyes of the at least one of the plurality of users are closed or the at least one of the plurality of users is not looking towards the virtual images,         identifying a given photo-emitting cell from amongst the four or more photo-emitting cells that corresponds to a given eye of the at least one of the plurality of users;

utilising the given photo-emitting cell to produce additional light to supplement light emanating from another photo-emitting cells from amongst the four or more photo-emitting cells that corresponds to at least one other of the plurality of users; and         controlling a corresponding portion of the light-steering optical device that lies on an optical path of the given photo-emitting cell, based on a viewing direction for the another photo-emitting cell, to direct light emanating from the given photo-emitting cell in said viewing direction.

Optionally, in the method, the first viewing direction and the second viewing direction for the given first photo-emitting cell belonging to the first set of photo-emitting cells and the given second photo-emitting cell belonging to the second set of photo-emitting cells are determined further based on a location of the given first photo-emitting cell and a location of the given second photo-emitting cell within the light-emitting surface, respectively.

Optionally, the method further comprises:

determining an ambient temperature using a temperature sensor;

detecting when the ambient temperature is below a predefined threshold temperature; and     when it is detected that the ambient temperature is below the predefined threshold temperature, generating the light field image by utilising a same colour for all photo-emitting cells on whose optical path a given lenticule of the lenticular array is arranged.

Optionally, in the method, the lenticular array and the light-steering optical device are implemented together as a liquid-crystal optical element.

Alternatively, optionally, in the method, the light-steering optical device is implemented as a liquid-crystal optical element.

DETAILED DESCRIPTION OF THE DRAWINGS

Figure 2:
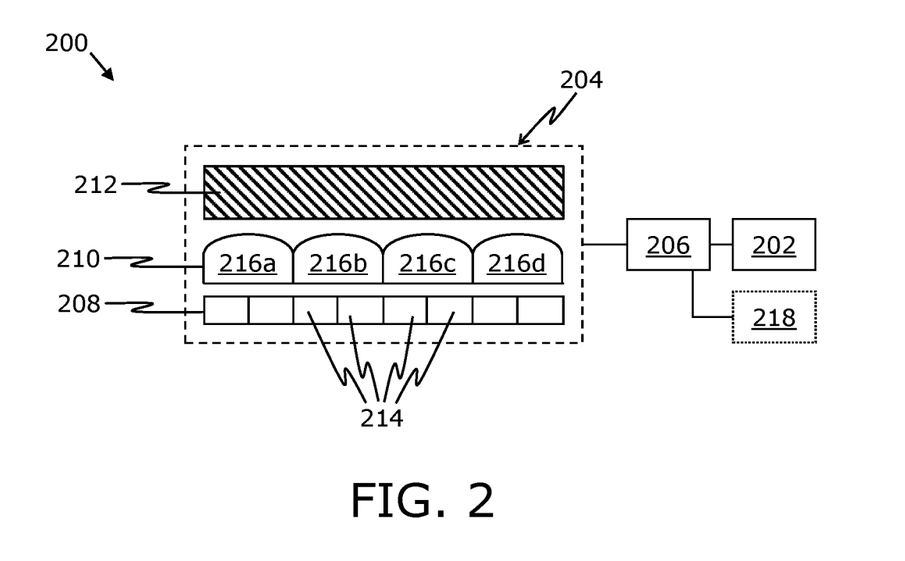
FIG. 2 illustrates a simplified example implementation of a system incorporating dynamic light steering based on relative location of viewer, in accordance with an embodiment of the present disclosure.

Referring to FIG. 2, illustrated is a simplified example implementation of a system 200 incorporating dynamic light steering based on a relative location of a viewer (namely, eyes of at least one user), in accordance with an embodiment of the present disclosure. With reference to FIG. 2, the system 200 comprises tracking means 202, a light field display unit 204, and at least one processor (for example, depicted as a processor 206). The light field display unit 204 comprises a light-emitting surface 208, a lenticular array 210, and a light-steering optical device 212 (depicted using a diagonal-line pattern). The lenticular array 210 is shown to be arranged on an optical path of the light-emitting surface 208. The light-steering optical device 212 is shown to be arranged on the optical path of the light-emitting surface 208. In some implementations (as shown), the light-steering optical device 212 is arranged on top of the lenticular array 210. However, in other implementations, the light-steering optical device 212 can be arranged in-between the light-emitting surface 208 and the lenticular array 210.

The light-emitting surface 208 comprises a plurality of photo-emitting cells 214. The lenticular array 210 comprises a plurality of lenticules (for example, depicted as lenticules 216a, 216b, 216c, and 216d, for sake of simplicity and clarity). In an example, as shown, a given lenticule from amongst the lenticules 216a-d corresponds to two photo-emitting cells. Optionally, the system 200 further comprises a temperature sensor 218. The processor 206 is communicably coupled to the tracking means 202, the light field display unit 204, and optionally, to the temperature sensor 218.

It may be understood by a person skilled in the art that FIG. 2 includes a simplified example implementation of the system 200, for sake of clarity, which should not unduly limit the scope of the claims herein. It is to be understood that the specific implementation of the system 200 is not to be construed as limiting it to specific numbers or types of tracking means, light field display units, processors, light-emitting surfaces, lenticular arrays, light-steering optical devices, photo-emitting cells, lenticules, and temperature sensors. The person skilled in the art will recognize many variations, alternatives, and modifications of embodiments of the present disclosure.

Figure 3:
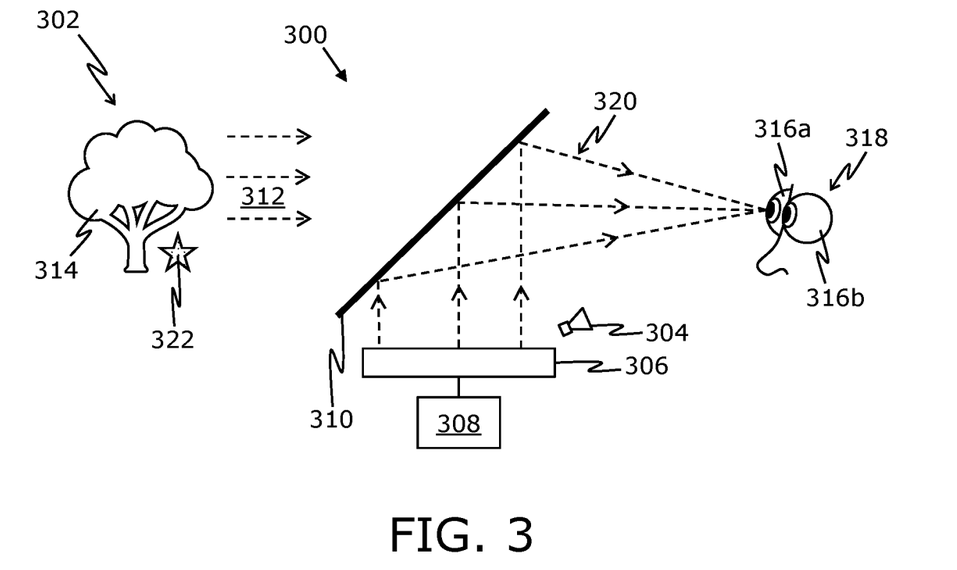
FIG. 3 illustrates an exemplary real-world environment in which a system incorporating dynamic light steering based on a relative location of a viewer is employed, in accordance with an embodiment of the present disclosure.

Referring to FIG. 3, illustrated is an exemplary real-world environment 300 in which a system 302 incorporating dynamic light steering based on a relative location of a viewer is employed, in accordance with an embodiment of the present disclosure. The system 300 is shown to be employed in a real-world environment 302. The system 300 comprises tracking means 304, a light field display unit 306, at least one processor (for example, depicted as a processor 308) and optionally, an optical combiner 310. The tracking means 304 is shown to be implemented, for example, as at least one tracking camera. The optical combiner 310 is shown to be arranged on an optical path of the light field display unit 306 and on an optical path of a real-world light field 312 of the real-world environment 302. In the real-world environment 302, there are one or more real-world objects, depicted as a real-world object 314 (shown as a tree).

When the system 300 is in use, the tracking means 304 is utilised by the processor 308 to determine a relative location of a first eye 316a and of a second eye 316b of a user 318 with respect to an imaginary image plane on which virtual images are to be presented to the first eye 316a and the second eye 316b. A synthetic light field 320 presenting the virtual images that represent at least one virtual object (depicted as a virtual object 322, shown as a star) is produced using the light field display unit 306. The optical combiner 310 is employed to reflect light emanating from a first set of photo-emitting cells of a light-emitting surface of the light field display unit 306 towards the first eye 316a and light emanating from a second set of photo-emitting cells of the light-emitting surface towards the second eye 316b, respectively, whilst optically combining the real-world light field 312 with a first part of the synthetic light field 320 produced by the light emanating from the first set of photo-emitting cells and with a second part of the synthetic light field 320 produced by the light emanating from the second set of photo-emitting cells.

Figure 4A:
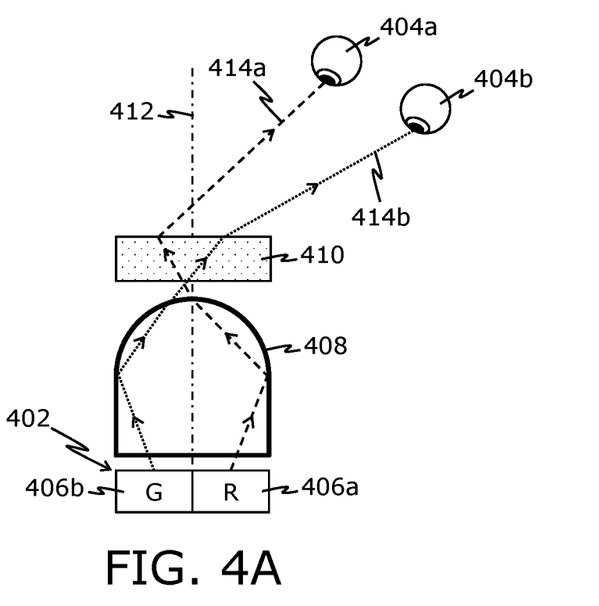
FIGS. 4A and 4B illustrate different exemplary scenarios of how light emanating from a light-emitting surface is directed towards a first eye and a second eye of a user, in accordance with an embodiment of the present disclosure.
Figure 4B:
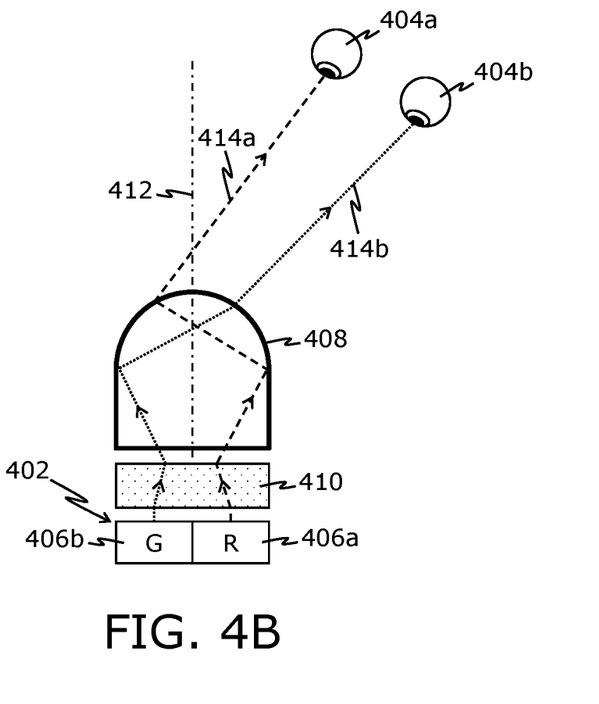

Referring to FIGS. 4A and 4B, illustrated are different exemplary scenarios of how light emanating from a light-emitting surface 402 is directed towards a first eye 404a and a second eye 404b of a user, in accordance with an embodiment of the present disclosure. With reference to FIGS. 4A and 4B, for sake of simplicity and clarity, only a portion of the light-emitting surface 402 is shown. The shown portion comprises two photo-emitting cells 406a and 406b, wherein the photo-emitting cell 406a is a red colour photo-emitting cell (depicted using a letter "R") and the photo-emitting cell 406b is a green colour photo-emitting cell (depicted using a letter "G"). For sake of simplicity and better understanding, a given lenticule 408 of a lenticular array is arranged on an optical path of the two photo-emitting cells 406a-b of the light-emitting surface 402. In other words, the given lenticule 408 corresponds to the two photo-emitting cells 406a-b. The given lenticule 408 has an optical axis 412 (depicted using a dash-dot line). A light-steering optical device 410 is arranged on an optical path of the light-emitting surface 402. For sake of simplicity and clarity, only a portion of the light-steering optical device 410 that lies in the optical path of the two photo-emitting cells 406a-b is shown. With reference to FIG. 4A, the light-steering optical device 410 is arranged on top of (the given lenticule 408 of) the lenticular array. With reference to FIG. 4B, the light-steering optical device 410 is arranged in-between the light-emitting surface 402 and (the given lenticule 408 of) the lenticular array.

With reference to FIGS. 4A and 4B, the light-steering optical device 410 is controlled (by at least one processor), based on a relative location of the first eye 404a and of the second eye 404b of the user, to direct light 414a (depicted using dashed line with arrows) emanating from the photo-emitting cell 406a towards the first eye 404a, and light 414b (depicted using dotted line with arrows) emanating from the photo-emitting cell 406b towards the second eye 404b. It will be appreciated that even when the first eye 404a and the second eye 404b are located on a same side of the optical axis 412 of the given lenticule 408, the light 414a and 414b is well-directed by the light-steering optical device 410 to display corresponding virtual images to the first eye 404a and the second eye 404b, respectively. Thus, in such a case, the first eye 404a and the second eye 404b of the user accurately perceives a stereoscopic effect when viewing said virtual images, unlike in case of the prior art where a stereoscopic effect is perceived only when eyes of a user are located within a very narrow range of viewing angles with respect to an optical axis of a given lenticule, and any deviation from these viewing angles results in a loss of the stereoscopic effect or a degradation of an overall visual quality of images displayed to said eyes.

Figure 5A:
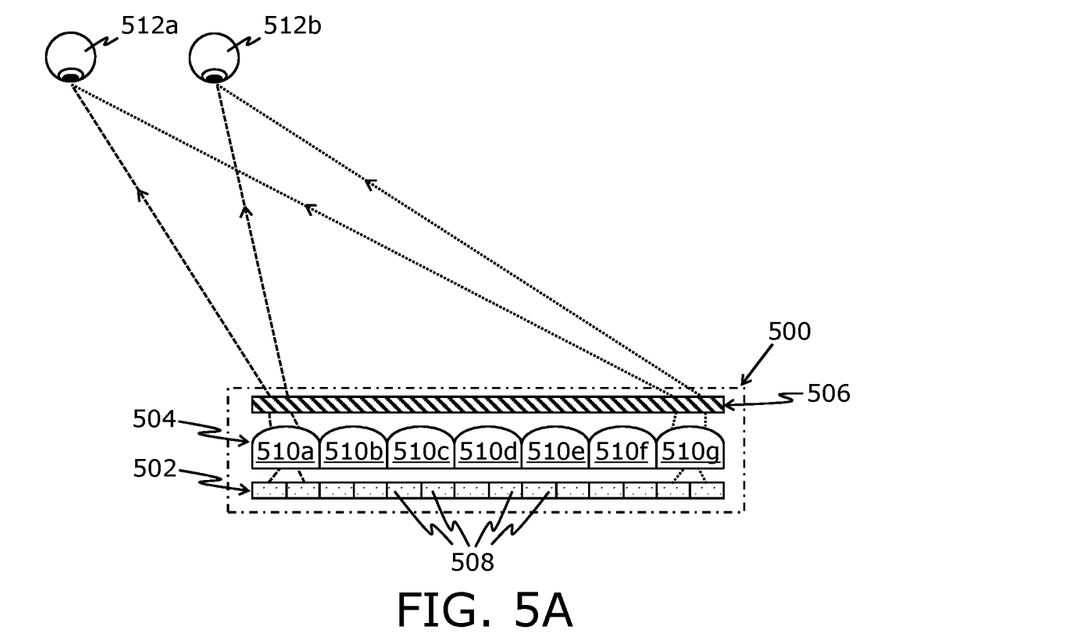
FIGS. 5A and 5B illustrate an exemplary scenario of how different light field images are displayed for two different users by employing temporal multiplexing, in accordance with an embodiment of the present disclosure.
Figure 5B:
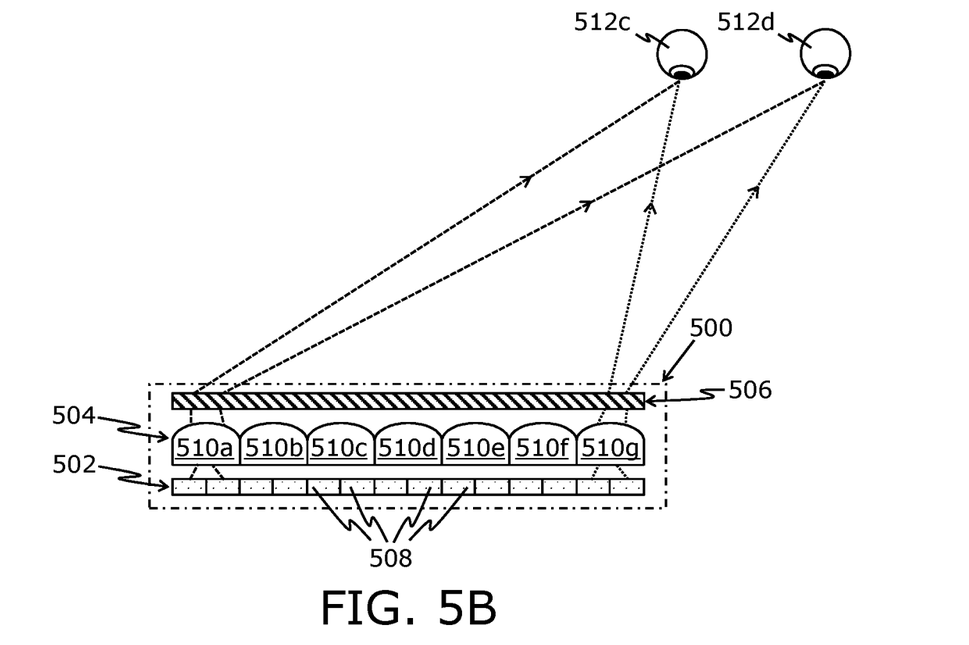

Referring to FIGS. 5A and 5B, illustrated is an exemplary scenario of how different light field images are displayed for at least two different users by employing temporal multiplexing, in accordance with an embodiment of the present disclosure. With reference to FIGS. 5A and 5B, the different light field images are displayed for the at least two different users, for example, depicted as a first user and a second user, via a light field display unit 500. The light field display unit 500 is shown to comprise a light-emitting surface 502 (depicted using a dotted pattern), a lenticular array 504, and a light-steering optical device 506 (depicted using a diagonal-line pattern). For sake of simplicity and clarity, a shown part of the light-emitting surface 502 comprises 14 photo-emitting cells 508. A shown part of the lenticular array 504 comprises 7 lenticules 510a, 510b, 510c, 510d, 510e, 510f, and 510g in a manner that a given lenticule of the lenticular array 504 is arranged on an optical path of two photo-emitting cells of the light-emitting surface 502. The light-steering optical device 506 is arranged on an optical path of the light-emitting surface 502; as shown, the light-steering optical device 506 is arranged on top of the lenticular array 504. When displaying the different light field images at a given frame rate (for example, 120 frames per second) for the first user and the second user by employing the temporal multiplexing, the light-steering optical device 506 is controlled (by at least one processor) to direct light emanating from the light emitting surface 502, based on a relative location of a first eye 512a and a second eye 512b of the first user, and based on a relative location of a first eye 512c and a second eye 512d of the second user, in a time-multiplexed manner. For sake of clarity, light emanating from only some of the photo-emitting cells 508 of the light emitting surface 502 is shown to be directed using the light-steering optical device 510. For example, with reference to the aforesaid scenario, an effective frame rate of displaying light field images for each of the first user and the second user would be 60 FPS. The different light field images are displayed for each of the first user and the second user in alternating time slots. For sake of better understanding, the aforesaid time multiplexing is shown to be employed for only two users. However, the aforesaid time multiplexing can also be employed for more than two users in a similar manner.

FIGS. 3, 4A, 4B, 5A, and 5B are merely examples, which should not unduly limit the scope of the claims herein. A person skilled in the art will recognize many variations, alternatives, and modifications of embodiments of the present disclosure.

Figure 6:
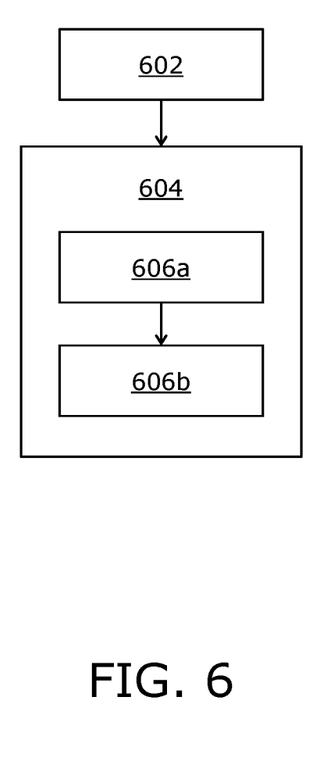
FIG. 6 illustrates steps of a method incorporating dynamic light steering based on relative location of viewer, in accordance with an embodiment of the present disclosure.

Referring to FIG. 6, illustrated are steps of a method incorporating dynamic light steering based on relative location of viewer, in accordance with an embodiment of the present disclosure. At step 602, tracking means is utilised to determine a relative location of a first eye and of a second eye of at least one user with respect to an imaginary image plane on which virtual images are to be presented to the first eye and the second eye. At step 604, a light field image is displayed via a light field display unit to produce a synthetic light field presenting the virtual images, whilst controlling a light-steering optical device, based on the relative location of the first eye and of the second eye of the at least one user, to direct light emanating from a first set of photo-emitting cells of a light-emitting surface towards the first eye and light emanating from a second set of photo-emitting cells of the light-emitting surface towards the second eye, wherein the light field display unit comprises: the light-emitting surface comprising a plurality of photo-emitting cells; a lenticular array arranged on an optical path of the light-emitting surface, the lenticular array comprising a plurality of lenticules; and the light-steering optical device arranged on the optical path of the light-emitting surface. Step 604 comprises steps 606a and 606b. At step 606a, a first viewing direction and a second viewing direction are determined for a given first photo-emitting cell belonging to the first set of photo-emitting cells and a given second photo-emitting cell belonging to the second set of photo-emitting cells, based on the relative location of the first eye and of the second eye of the at least one user, respectively, the given first photo-emitting cell neighbouring the given second photo-emitting cell on the light-emitting surface. At step 606b, a given portion of the light-steering optical device is controlled, based on the first viewing direction and the second viewing direction, to direct light emanating from the given first photo-emitting cell along the first viewing direction and light emanating from the given second photo-emitting cell along the second viewing direction, the given portion of the light-steering optical device lying on an optical path of the given first photo-emitting cell and the given second photo-emitting cell.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising: tracking means; a light field display unit comprising: a light-emitting surface comprising a plurality of photo-emitting cells; a lenticular array arranged on an optical path of the light-emitting surface, the lenticular array comprising a plurality of lenticules; and a light-steering optical device arranged on the optical path of the light-emitting surface; and at least one processor configured to: utilize the tracking means to determine a relative location of a first eye of a user and of a second eye of the user with respect to an imaginary image plane on which virtual images are to be presented to the first eye and the second eye; and display a light field image via the light field display unit to produce a synthetic light field presenting the virtual images, whilst controlling the light-steering optical device, based on the relative location of the first eye and of the second eye, to direct light emanating from a first set of photo-emitting cells of the light-emitting surface towards the first eye and light emanating from a second set of photo-emitting cells of the light emitting surface towards the second eye, wherein when controlling the light-steering optical device, the at least one processor is configured to: determine a first viewing direction and a second viewing direction for a given first photo-emitting cell belonging to the first set of photo-emitting cells and a given second photo-emitting cell belonging to the second set of photo-emitting cells, based on the relative location of the first eye and of the second eye, respectively, the given first photoemitting cell neighboring the given second photo-emitting cell on the light-emitting surface; and control a given portion of the light-steering optical device that lies on an optical path of the given first photo-emitting cell and the given second photo-emitting cell, based on the first viewing direction and the second viewing direction, to direct light emanating from the given first photo-emitting cell along the first viewing direction and light emanating from the given second photo-emitting cell along the second viewing direction; wherein when it is detected that an ambient temperature is below a predefined threshold temperature, generate the light field image by utilizing a same color for all photo-emitting cells on whose optical path a given lenticule of the lenticular array is arranged.

2. The system of claim 1, further comprising an optical combiner arranged on an optical path of the light field display unit and on an optical path of a real-world light field of a real-world environment, wherein the optical combiner is employed to reflect the light emanating from the first set of photo-emitting cells and the light emanating from the second set of photo-emitting cells towards the first eye and the second eye, respectively, whilst optically combining the real-world light field with a first part of the synthetic light field produced by the light emanating from the first set of photo-emitting cells and with a second part of the synthetic light field produced by the light emanating from the second set of photo-emitting cells.

3. The system of claim 1, wherein the user comprises a plurality of users, wherein the at least one processor is configured to display different light field images for different ones of the plurality of users via the light field display unit, whilst controlling the light-steering optical device, based on relative locations of first eyes and second eyes of the different ones of the plurality of users, by employing temporal multiplexing.

4. The system of claim 1, wherein the user comprises a plurality of users, and wherein a given lenticule of the lenticular array is arranged on an optical path of four or more photo-emitting cells of the light-emitting surface, wherein the at least one processor is configured to:
detect when eyes of at least one of the plurality of users are closed or the at least one of the plurality of users is not looking towards the virtual images; and
when it is detected that the eyes of the at least one of the plurality of users are closed or the at least one of the plurality of users is not looking towards the virtual images,
identify a given photo-emitting cell from amongst the four or more photo-emitting cells that corresponds to a given eye of the at least one of the plurality of users; and
dim the given photo-emitting cell that corresponds to the given eye of the at least one of the plurality of users.

5. The system of claim 1, wherein the user comprises a plurality of users, and wherein a given lenticule of the lenticular array is arranged on an optical path of four or more photo-emitting cells of the light-emitting surface, wherein the at least one processor is configured to:
detect when eyes of at least one of the plurality of users are closed or the at least one of the plurality of users is not looking towards the virtual images; and
when it is detected that the eyes of the at least one of the plurality of users are closed or the at least one of the plurality of users is not looking towards the virtual images,
identify a given photo-emitting cell from amongst the four or more photo-emitting cells that corresponds to a given eye of the at least one of the plurality of users;
utilize the given photo-emitting cell to produce additional light to supplement light emanating from another photo-emitting cell from amongst the four or more photo-emitting cells that corresponds to at least one other of the plurality of users; and
control a corresponding portion of the light-steering optical device that lies on an optical path of the given photo-emitting cell, based on a viewing direction for the another photo-emitting cell, to direct light emanating from the given photo-emitting cell along said viewing direction.

6. The system of claim 1, wherein the first viewing direction and the second viewing direction for the given first photo-emitting cell belonging to the first set of photo-emitting cells and the given second photo-emitting cell belonging to the second set of photo-emitting cells are determined further based on a location of the given first photo-emitting cell and a location of the given second photo-emitting cell within the light-emitting surface, respectively.

7. The system of claim 1, further comprising a temperature sensor, wherein the at least one processor is configured to: determine the ambient temperature using the temperature sensor; and detect when the ambient temperature is below the predefined threshold temperature.

8. The system of claim 1, wherein the lenticular array and the light-steering optical device are implemented together as a liquid-crystal optical element.

9. The system of claim 1, wherein the light-steering optical device is implemented as a liquid-crystal optical element.

10. A method comprising: utilizing tracking means to determine a relative location of a first eye of a user and of a second eye of the user with respect to an imaginary image plane on which virtual images are to be presented to the first eye and the second eye; and displaying a light field image via a light field display unit to produce a synthetic light field presenting the virtual images, whilst controlling a light-steering optical device, based on the relative location of the first eye and of the second eye, to direct light emanating from a first set of photo-emitting cells of a light-emitting surface towards the first eye and light emanating from a second set of photo-emitting cells of the light-emitting surface towards the second eye, wherein the light field display unit comprises: the light-emitting surface comprising a plurality of photoemitting cells; a lenticular array arranged on an optical path of the light-emitting surface, the lenticular array comprising a plurality of lenticules; and the light-steering optical device arranged on the optical path of the light-emitting surface, wherein the step of controlling the light-steering optical device comprises: determining a first viewing direction and a second viewing direction for a given first photo-emitting cell belonging to the first set of photo-emitting cells and a given second photo-emitting cell belonging to the second set of photo-emitting cells, based on the relative location of the first eye and of the second eye, respectively, the given first photo-emitting cell neighboring the given second photo-emitting cell on the light emitting surface; and controlling a given portion of the light-steering optical device that lies on an optical path of the given first photo-emitting cell and the given second photo-emitting cell, based on the first viewing direction and the second viewing direction, to direct light emanating from the given first photo-emitting cell along the first viewing direction and light emanating from the given second photo-emitting cell along the second viewing direction; wherein when it is detected that an ambient temperature is below a predefined threshold temperature, generating the light field image by utilizing a same color for all photo-emitting cells on whose optical path a given lenticule of the lenticular array is arranged.

11. The method of claim 10, wherein an optical combiner is employed to reflect the light emanating from the first set of photo-emitting cells and the light emanating from the second set of photo-emitting cells towards the first eye and the second eye, respectively, whilst optically combining a real-world light field of a real-world environment with a first part of the synthetic light field produced by the light emanating from the first set of photo-emitting cells and with a second part of the synthetic light field produced by the light emanating from the second set of photo-emitting cells, wherein the optical combiner is arranged on an optical path of the light field display unit and on an optical path of the real-world light field of the real-world environment.

12. The method of claim 10, wherein the user comprises a plurality of users, wherein the method further comprises displaying different light field images for different ones of the plurality of users via the light field display unit, whilst controlling the light-steering optical device, based on relative locations of first eyes and second eyes of the different ones of the plurality of users, by employing temporal multiplexing.

13. The method of claim 10, wherein the user comprises a plurality of users, and wherein a given lenticule of the lenticular array is arranged on an optical path of four or more photo-emitting cells of the light-emitting surface, wherein the method further comprises:
    detecting when eyes of at least one of the plurality of users are closed or the at least one of the plurality of users is not looking towards the virtual images; and
    when it is detected that the eyes of the at least one of the plurality of users are closed or the at least one of the plurality of users is not looking towards the virtual images,
        identifying a given photo-emitting cell from amongst the four or more photo-emitting cells that corresponds to a given eye of the at least one of the plurality of users; and
        dimming the given photo-emitting cell that corresponds to the given eye of the at least one of the plurality of users.

14. The method of claim 10, wherein the user comprises a plurality of users, and wherein a given lenticule of the lenticular array is arranged on an optical path of four or more photo-emitting cells of the light-emitting surface, wherein the method further comprises:
    detecting when eyes of at least one of the plurality of users are closed or the at least one of the plurality of users is not looking towards the virtual images; and
    when it is detected that the eyes of the at least one of the plurality of users are closed or the at least one of the plurality of users is not looking towards the virtual images,
        identifying a given photo-emitting cell from amongst the four or more photo-emitting cells that corresponds to a given eye of the at least one of the plurality of users;
        utilising the given photo-emitting cell to produce additional light to supplement light emanating from another photo-emitting cell from amongst the four or more photo-emitting cells that corresponds to at least one other of the plurality of users; and
        controlling a corresponding portion of the light-steering optical device that lies on an optical path of the given photo-emitting cell, based on a viewing direction for the another photo-emitting cell, to direct light emanating from the given photo-emitting cell along said viewing direction.

15. The method of claim 10, wherein the first viewing direction and the second viewing direction for the given first photo-emitting cell belonging to the first set of photo-emitting cells and the given second photo-emitting cell belonging to the second set of photo-emitting cells are determined further based on a location of the given first photo-emitting cell and a location of the given second photo-emitting cell within the light-emitting surface, respectively.

16. The method of claim 10, further comprising: determining the ambient temperature using a temperature sensor; and detecting when the ambient temperature is below the predefined threshold temperature.

17. The method of claim 10, wherein the lenticular array and the light-steering optical device are implemented together as a liquid-crystal optical element.

18. The method of claim 10, wherein the light-steering optical device is implemented as a liquid-crystal optical element.

* * * * *